Sept. 26, 1933.    A. E. FREEMAN ET AL    1,927,978
WINCH BRAKE
Filed Oct. 1, 1930
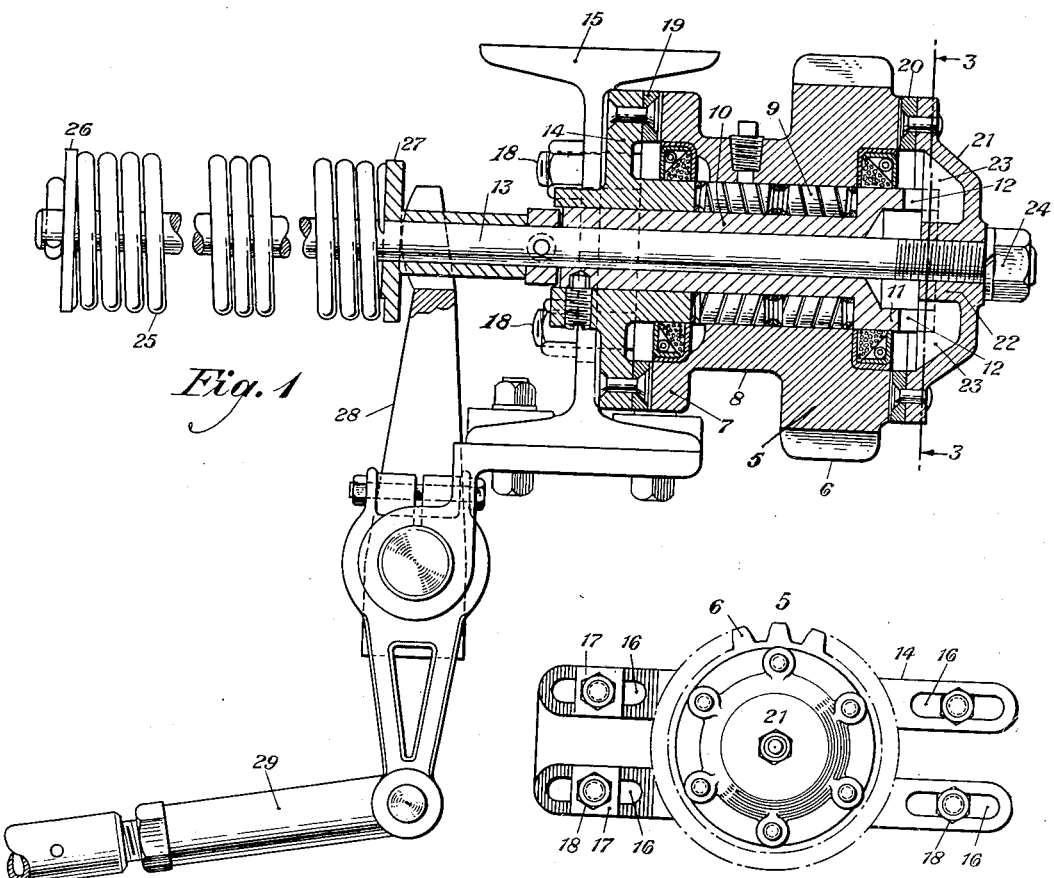
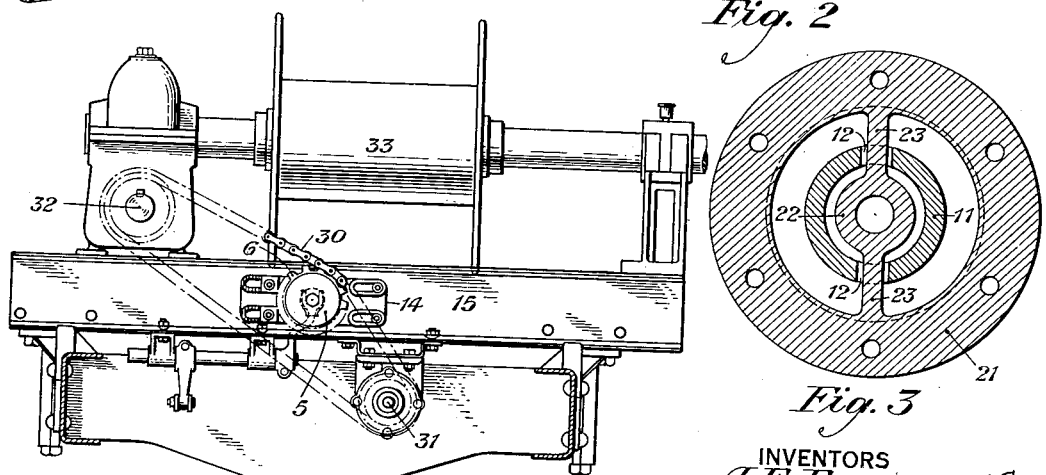
INVENTORS
A. E. Freeman and
T. C. Smith
BY
ATTORNEY Patented Sept. 26, 1933

1,927,978

UNITED STATES PATENT OFFICE 1,927,978

WINCH BRAKE

Albert E. Freeman, East Orange, and Temple C. Smith, Westfield, N. J., assignors to American Telephone and Telegraph Company, a corporation of New York Application October 1, 1930. Serial No. 485,766

1 Claim. (Cl. 188—72)

This invention relates to hoisting or pulling apparatus such as winches, and more particularly to braking mechanism therefor.

In the operation of unwinding rope from winches, as in the case of lowering a suspended load, the momentum of the rapidly moving chain and gears which transmit engine power to the winch have a tendency to cause the winch drum to continue to rotate and unwind rope after the power is shut off. If not counteracted, this action may result in accidents.

Accordingly, it is an object of this invention to provide braking mechanism for automatically stopping the rotation of the winch drum due to momentum at the moment power ceases to be applied to the winch shaft.

These and further objects will be apparent from the following description, when considered in connection with the accompanying drawing, in which one embodiment of the invention is illustrated.

Referring to the drawing, Figure 1 is a side elevation of the improved braking mechanism in section; Fig. 2 is an end view of said mechanism; Fig. 3 is a section taken on the line 3—3 of Fig. 1; and Fig. 4 is an elevation of winch mechanism showing the improved device applied thereto.

In the improved arrangement, an idler sprocket 5 is shown as being provided with integral parts comprising a gear portion 6, an extension 7, and a web member 8 for interconnecting the gear and extension portions of the sprocket. The sprocket 5 is carried on bearings 9 which roll on the spindle 10. This spindle is provided at one end with a collar 11 into which two oppositely positioned slots 12, 12 extend, for a purpose to be presently described. A bolt 13 extends through the center of the sprocket and passes through a bracket 14, by which it is suitably supported, and also through an I-beam 15. The bracket 14 is bolted to the I-beam 15 which lies in a transverse position on a truck and is supported thereon by the usual framework. The bracket is substantially rectangular in form and is provided at its corners with raised portions or bosses, and longitudinal slots 16 extend therethrough. The surfaces of certain of the bosses may be serrated, and washers 17, cooperating therewith, may have similar engaging surfaces. Bolts 18 pass through these washers and through the various slots and serve to lock the bracket and its associated elements in position on the I-beam. It will be noted that through the agency of the slots 16, the bracket and its associated elements may be adjusted by sidewise movement for the purpose of taking slack out of a chain with which the sprocket is connected, as will later appear.

The sprocket 5 is mounted between two rings 19 and 20. The ring 19 is suitably affixed to the bracket 14 and the ring 20 to a brake plate 21. The rings are made of suitable material to provide frictional surfaces to bear against the sprocket 5 when desired to produce a braking action thereon. The brake plate 21 may be in the form of a cap, as more clearly shown in Fig. 1, and is provided with an inwardly extending hub portion 22, and radial arms 23 connect the hub with the main portion of the brake plate, Fig. 3. The bolt 13 extends through the hub 22, and a nut 24 serves to maintain the plate in position. The plate is prevented from revolving by the registration of the arms 23 in the parallel slots 12, 12 provided on the spindle 10.

The bolt 13 carries a spring 25 on its inner end. This spring is maintained in compressed position between the collars 26 and 27 which are suitably mounted on said bolt. A forked rocker arm 28, which is connected in any well known manner to a push rod 29, engages the collar 27. The push rod 29 is connected through suitable linkage to a clutch pedal (not shown) which extends forwardly of the truck to a position where it may be manipulated by an operator. The spring 25 is provided for the purpose of compensating for any change in the position of the clutch pedal due to wear thereon which might tend to throw the braking mechanism out of adjustment.

The sprocket 5 engages a chain 30 by which power is transmitted from a power shaft 31 to the shaft 32 to drive the winch 33. Suitable lubricating means are provided throughout for the various elements.

In the operation of the improved device, the sprocket will rotate idly when the power is applied to drive the winch in a direction to wind rope upon its drum. When power ceases to be applied and the clutch pedal is released, pressure is transmitted by the push rod to the forked rocker and thence to the spring on the brake bolt, causing it to be moved to the left. This movement of the brake bolt will cause it to force the brake plate and its attached friction ring to the left against the sprocket, thereby clamping said sprocket between the last mentioned friction ring and the friction ring carried by the bracket. The frictional surfaces of these rings against the sides of the sprocket in its clamped position will cause a braking action to be exerted thereon to prevent its rotation. This braking action on the sprocket will automatically stop its rotation and hold its engaged chain after power ceases to be applied to the power shaft. The sprocket will thus add sufficient friction to that supplied by a worm and worm wheel mounted on the winch drive shaft to check the momentum of the winch drum, rotating shafts and gears; and stop the further unwinding of rope therefrom, and thus stop a descending load carried by said rope.

What is claimed is:

A braking mechanism for a winch drum and its shaft including a shaft for transmitting power thereto, a chain connecting the winch shaft and power shaft, a gear member engaging said chain and being positioned between the winch shaft and power shaft, means for moving said gear member to adjust said chain, friction means including a ring member positioned on each side of the gear member, a brake plate directly connected with one of said ring members, and means including a forked rocker for moving the brake plate to clamp the gear member between said friction means to stop its rotation and check the momentum of the winch shaft and drum and also hold said chain after power ceases to be applied to the power shaft.

ALBERT E. FREEMAN.
TEMPLE C. SMITH.